(12) United States Patent
Morlock et al.

(10) Patent No.: US 9,097,542 B2
(45) Date of Patent: Aug. 4, 2015

(54) METHODS OF PRE-PROCESSING PROBE DATA

(75) Inventors: Clayton Richard Morlock, Lebanon, NH (US); Shaundrea Margaret Newman Kenyon, Grantham, NH (US)

(73) Assignee: TomTom North America, Inc., Lebanon, NH (US)

( * ) Notice: Subject to any disclaimer, the term of this patent is extended or adjusted under 35 U.S.C. 154(b) by 411 days.

(21) Appl. No.: 13/388,743

(22) PCT Filed: Jun. 10, 2010

(86) PCT No.: PCT/US2010/038090
§ 371 (c)(1),
(2), (4) Date: Jun. 11, 2012

(87) PCT Pub. No.: WO2011/016902
PCT Pub. Date: Feb. 10, 2011

(65) Prior Publication Data
US 2012/0259547 A1   Oct. 11, 2012

Related U.S. Application Data

(60) Provisional application No. 61/273,185, filed on Aug. 3, 2009.

(51) Int. Cl.
*G01C 21/32* (2006.01)
*G06F 11/00* (2006.01)
*G06F 11/34* (2006.01)

(52) U.S. Cl.
CPC ............... *G01C 21/32* (2013.01); *G06F 11/00* (2013.01); *G06F 11/3466* (2013.01)

(58) Field of Classification Search
CPC ....... G01C 21/32; G01C 21/367; G06T 17/05
USPC .......................................................... 701/533
See application file for complete search history.

(56) References Cited

U.S. PATENT DOCUMENTS 7,330,787 B2 * 2/2008 Agrawala et al. ............. 701/532
7,538,690 B1   5/2009 Kaplan et al.
(Continued)

FOREIGN PATENT DOCUMENTS

| DE | 102007045082 A1 | 4/2009 |
| EP | 1096229 A1 | 5/2001 |
| EP | 2023084 A2 | 2/2009 |

OTHER PUBLICATIONS

XP007912901—Heiner Ackermann et al: "GPS-Route", Internet Citation, Dec. 2, 2008 p. 82 pp. Retrieved from the Internet: URL:http://www.tzi.de/~edelkamp/Endbericht/End.pdf [retrieved on May 3, 2010].

(Continued)

*Primary Examiner* — Nicholas Kiswanto

(57) ABSTRACT

Methods of pre-processing probe trace data include examining a sequential dataset for a route of travel between two points, identifying at least one anomaly in the sequential dataset, identifying at least one datum of the sequential dataset occupying a sequential position adjacent to the identified at least one anomaly, and inserting at least one non-anomalous datum to occupy a sequential position of the identified at least one anomaly in the sequential dataset, the at least one non-anomalous datum being determined based on one of extrapolation, smoothing and interpolation of the at least one datum.

20 Claims, 12 Drawing Sheets

(56) References Cited

U.S. PATENT DOCUMENTS

| | | | |
|---|---|---|---|
| 7,542,882 B2* | 6/2009 | Agrawala et al. | 703/2 |
| 7,747,381 B2* | 6/2010 | Adachi | 701/118 |
| 7,885,764 B2* | 2/2011 | Van Buer | 701/450 |
| 7,957,893 B2* | 6/2011 | Smartt | 701/450 |
| 2006/0122846 A1* | 6/2006 | Burr et al. | 705/1 |
| 2007/0208544 A1 | 9/2007 | Kulach et al. | |
| 2008/0312814 A1 | 12/2008 | Broadbent et al. | |
| 2009/0079586 A1 | 3/2009 | Bespalov et al. | |
| 2009/0138188 A1 | 5/2009 | Kores et al. | |
| 2009/0177678 A1 | 7/2009 | Clark et al. | |

OTHER PUBLICATIONS

XP019277108—Stefan Schroedl et al: "Mining GPS Traces for Map Refinement", Data Mining and Knowledge Discover, Kluwer Academic Publishers, BO, vol. 9, No. 1, Jul. 1, 2004, pp. 59-87.

Cheng, et al "Accuracy Characterization for metropolitan-scale Wi-Fi Localization," MobiSys 2005 Published Jun. 8, 2005 [retrieved on Jul. 21, 2010]. Retrieved from the Internet. <URL: http://www.usenix.org/event/mobisys05/tech/full_papers/cheng/cheng_html>.

International Search Report issued Aug. 10, 2010 for International Application No. PCT/US2010/038090.

* cited by examiner

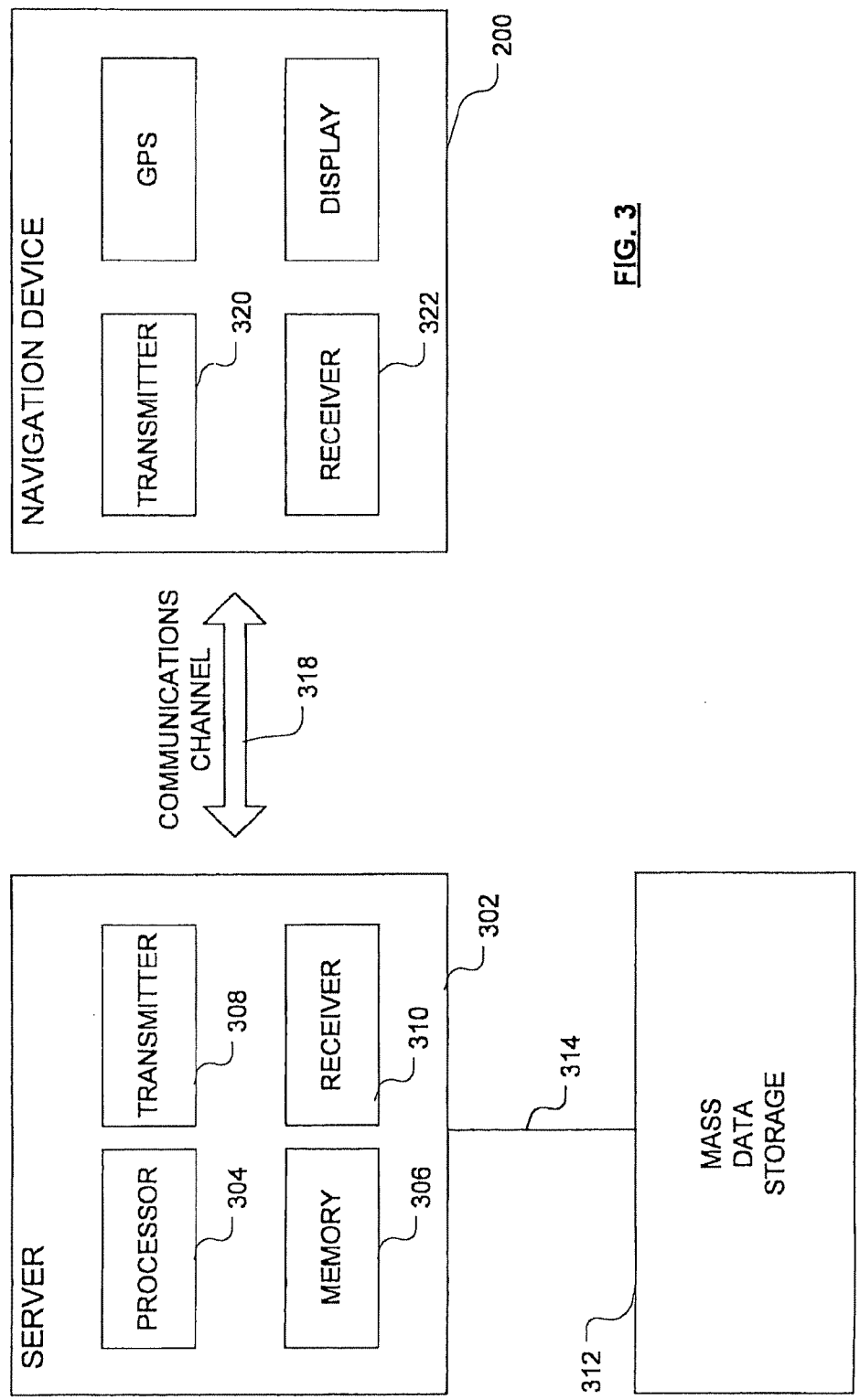

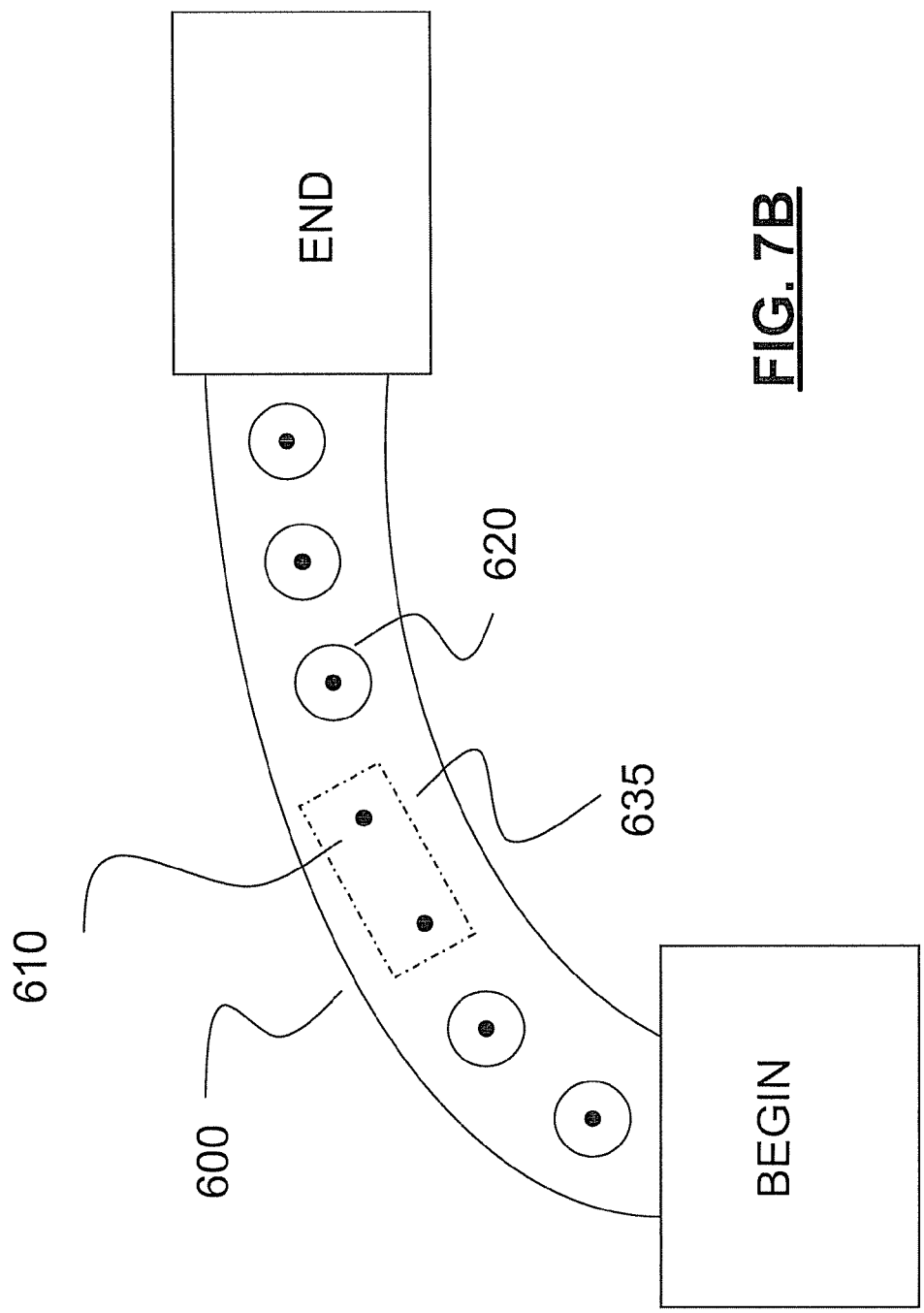

METHODS OF PRE-PROCESSING PROBE DATA

PRIORITY STATEMENT

This application claims priority under 35 U.S.C. §119(e) to U.S. Provisional Patent Application No. 61/273185, filed on Aug. 3, 2009, in the United States Patent and Trademark Office (U.S.P.T.O.), the entire contents of which is hereby incorporated herein by reference.

FIELD

The present application generally relates to methods of pre-processing sequential positional data, and specifically to methods of pre-processing probe trace data, electronic maps including features based on the pre-processed probe trace data and electronic devices including the electronic maps.

BACKGROUND

In recent years, consumers have been provided with a multitude of devices using electronic maps for a variety of different purposes. For example, electronic maps may be used in electronic devices to facilitate navigation, locate places of interest, find addresses, etc. When an electronic device is used to facilitate navigation, the device may use, for example, GPS (Global Positioning System) signal reception and processing functionality. Examples of electronic devices with navigational capabilities and systems used by consumers include in-vehicle navigation systems that enable vehicle operators to navigate over streets, roads, airways, shipping lanes and the like; hand-held devices such as personal digital assistants ("PDAs"), personal navigation devices (PNDs), and cell phones or other types of mobile devices that can do the same; desktop applications, and internet applications in which users can generate maps showing desired places. The common aspect in all of these and other types of devices and systems is a map database of geographic features, vectors and attributes, and software to access, manipulate and navigate the map database in response to user inputs.

Electronic maps may be virtual environments that model 'real-world' 2 or 3 dimensional regions using data points corresponding to physical locations. For example, an electronic map may simulate a part of the ocean, a portion of the Earth's surface or the airspace above the earth. In order to model such large regions, each virtual environment may include hundreds of millions of data points. Each data point generally corresponds to a 2 or 3 dimensional point relative to a fixed reference.

An electronic device directed at, for example, ground vehicles may include an electronic map having travelable routes for one or more continents. Generally, the electronic device will display a portion of the electronic map, including travelable routes, as a graphic using a compressed scale. Further, the electronic device will often display non-route features as well, for example buildings, landmarks, geological features, etc.

Positional data representing the routes and non-route features may be accurate, for example, to 3 meters or less. However, the accuracy and detail of the data may depend on, for example, the amount of data collected for a particular location and the time the data was collected.

A time in which data is collected affects the accuracy of an electronic map because the world is not a static construct. Even if a comprehensive map database is compiled that includes every possible characteristic of route, new routes may be built, existing routes may be removed and/or existing routes may shift due to, for example, new building construction. Existing routes may also change temporarily, such as when a road is rebuilt and a detour is created. As a result, varying attempts have been made to iteratively collect data over time in order to keep electronic maps current.

Recently it has been proposed that electronic maps may be kept current by utilizing the cooperation of electronic device users. With the permission of the device user, temporal positional data, referred to as a probe trace, may be collected by, for example, recording sequential positional data of an electronic device over one or more periods of time. Probe trace data may be continuously collected and uploaded to a central server.

Probe traces consisting of a series of sequential location measurements that represent the movement of a vehicle or pedestrian using a navigation device may be used to infer and subsequently map the location of a road centerline or pathway being traveled. Although a GPS or other location measuring sensor used in the navigation device may be of poor accuracy and/or precision, by statistically averaging probe traces from several vehicles traversing the same road, the precision and accuracy of the inferred road centerline may be improved.

Most statistical models used to determine a road centerline from numerous probe traces may utilize Gaussian statistics (a normal distribution). A normal distribution implies that most probe traces will fall near the centerline of the actual road or lane being traveled. Inherent in Gaussian statistics is that random noise (e.g. error in location measurements) may be normally or randomly distributed around a mean. However, with respect to GPS and other forms of position measurement, error may not be normally distributed and Gaussian statistics may not be valid.

For example, GPS signals require line-of-sight between the satellites and the receiver. If there is an obstruction that prohibits a line-of-sight view and a further obstruction acts as a reflector, a systematic (non-Gaussian) error may occur in positional measurements. The systematic error may be due to an increase in the time required for the satellite signal to reach the receiver.

FIGS. 12A and 12B are example diagrams illustrating an "urban canyon effect" which may result in sequential positional data including non-Gaussian error. FIG. 12A is a diagram illustrating GPS signal propagation and a multi-path phenomena. FIG. 12B is a diagram illustrating positional measurement error due to the multi-path phenomena.

Referring to FIG. 12A, a satellite signal 1210 from a GPS satellite 1200 may be received at a GPS antenna 1220. The satellite signal 1210 may be unimpeded and may not cause an error in a positional measurement. A satellite signal 1240 from a GPS satellite 1230 may be obstructed by an obstacle 1250. The satellite signal 1240 may be reflected from a GPS multi-path object 1260 and received by the GPS antenna 1220. The reflected satellite signal 1240 may travel a longer distance than if the satellite signal 1240 is unimpeded. An error may occur in a positional measurement due to the time delay in receiving the reflected satellite signal 1240 due to the longer distance travelled by the reflected satellite signal 1240.

Referring to FIG. 12B, a series of real positions 1270 are shown. The real positions 1270 may correspond to geographic locations at which positional measurements may be recorded. DGPS positions 1280 may be positions corresponding to GPS positional data recorded for real positions 1270. The DGPS positions 1280 may not coincide with the real positions 1270 due to, for example, multi-path error in the positional measurements. Positions DGPS 1290 illustrate a case where the real positions 1270 and positions corresponding to GPS measurement data coincide (e.g., no error). Accordingly, FIG. 12B may demonstrate non-Gaussian error in positional measurements.

SUMMARY

Example embodiments of the inventive concept include methods of identifying non-random noise in a given probe trace and replacing the noise with pseudo data points that may be, for example, either an average of data in the probe trace or data falling on a curve conforming to the data. With non-random noise removed, street centerlines calculated using a Gaussian statistical average of probe traces may be more accurate.

A method of pre-processing probe trace data is disclosed, the method including examination of a sequential dataset for a route of travel between two points, identifying at least one anomaly in the sequential dataset, and identifying at least one datum of the sequential dataset occupying a sequential position adjacent to the identified at least one anomaly.

According to at least one embodiment, a method of pre-processing probe data may include inserting at least one non-anomalous datum to occupy a sequential position of the identified at least one anomaly in the sequential dataset, the at least one non-anomalous datum being determined based on one of extrapolation, smoothing and interpolation of the at least one datum.

According to at least one embodiment, a method of pre-processing probe data may include determining a first trajectory of at least one vehicle based on data of the sequential dataset which occupies a sequential position prior to the identified at least one anomaly, determining a second trajectory of the at least one vehicle based on data of the sequential dataset which occupies a sequential position after the identified at least one anomaly, determining whether or not a correlation exists between the first and second trajectories and inserting at least one non-anomalous datum to occupy a sequential position of the identified at least one anomaly in the sequential dataset, the at least one non-anomalous datum being determined based on one of extrapolation, smoothing and interpolation of the at least one datum.

According to at least one embodiment, a method of pre-processing probe data may include examining a plurality of sequential location measurements for a route of travel between two points, fitting a best fit mathematical curve to the plurality of sequential location measurements, identifying at least one anomaly by identifying at least one of the plurality of sequential location measurements that does not fall near the best fit mathematical curve within a statistical threshold, removing the identified at least one anomaly, and inserting sequential location data corresponding to the best fit mathematical curve in place of the anomaly.

BRIEF DESCRIPTION OF THE DRAWINGS

The present application will be described in more detail below by using example embodiments, which will be explained with the aid of the drawings, in which:

FIG. 3 illustrates manner in which a navigation device may receive information over a wireless communications channel, according to an example embodiment;

FIGS. 7A-7B are diagrams illustrating anomalies in a sequential dataset for a route.

Figure 1:
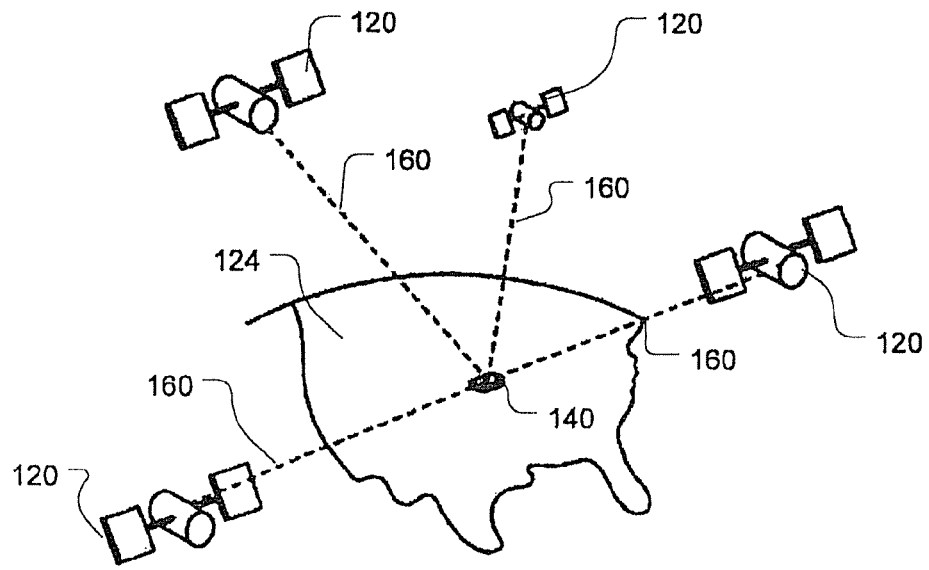
FIG. 1 illustrates a Global Positioning System (GPS)

These Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Spatially relative terms, e.g., "beneath," "below," "lower," "above," "upper" and the like, may be used herein for ease of description to describe one element or a relationship between a feature and another element or feature as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, for example, the term "below" can encompass both an orientation which is above as well as below. The device may be otherwise oriented (rotated 90 degrees or viewed or referenced at other orientations) and the spatially relative descriptors used herein should be interpreted accordingly.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It is convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, that perform particular tasks or implement particular abstract data types and may be implemented using existing hardware at existing network elements or control nodes (e.g., a database). Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of example embodiments are typically encoded on some form of computer readable medium or implemented over some type of transmission medium. The computer readable medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. Example embodiments are not limited by these aspects of any given implementation.

Example embodiments will now be described with particular reference to a portable navigation device (PND). It should be understood that the teachings of the present disclosure are not limited to PNDs and are universally applicable to any type of processing device that is configured to display maps. It follows therefore that in the context of the present application, a map displaying device is intended to include (without limitation) any type of route planning and/or navigation device, irrespective of whether that device is embodied as a PND, a navigation device built into a vehicle, or indeed a computing resource (such as a desktop or portable personal computer (PC), mobile telephone or portable digital assistant (PDA) displaying maps).

It will also be apparent from the following that the teachings of the present disclosure even have utility in circumstances where a user is not seeking instructions on how to navigate from one point to another, but merely wishes to be provided with a view of a given location. In such circumstances the "destination" location selected by the user need not have a corresponding start location from which the user wishes to start navigating, and as a consequence references herein to the "destination" location or indeed to a "destination" view should not be interpreted to mean that the generation of a route is essential, that travelling to the "destination" must occur, or indeed that the presence of a destination requires the designation of a corresponding start location.

FIG. 1 illustrates an example view of Global Positioning System (GPS), usable by navigation devices, including a navigation device according to an example embodiment. Such systems are used for a variety of purposes. In general, GPS is a satellite-radio based navigation system capable of determining continuous position, velocity, time, and in some instances direction information for an unlimited number of users.

Formerly known as NAVSTAR, the GPS incorporates a plurality of satellites which work with the earth in extremely precise orbits.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position can be determined, with only two signals using other triangulation techniques). When implementing geometric triangulation, the receiver utilizes the three known positions to determine an own two-dimensional position relative to the satellites. Determining the two-dimensional position can be done in a known manner. Additionally, acquiring a fourth satellite signal will allow the receiving device to calculate a three dimensional position of the receiver by the same geometrical calculation in a known manner. The position and velocity data can be updated in real time on a continuous basis by an unlimited number of users.

FIG. 1 illustrates a GPS system 100. A plurality of satellites 120 are in orbit about the earth 124. The orbit of each satellite 120 may not be synchronous with the orbits of other satellites 120 and, in fact, is likely asynchronous. A GPS receiver 140, usable in navigation devices according to example embodiments, is shown receiving spread spectrum GPS satellite signals 160 from the various satellites 120.

The spread spectrum signals 160 may be continuously transmitted from each satellite 120 to utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver 140 generally acquires spread spectrum GPS satellite signals 160 from at least three satellites 120 for the GPS receiver 140 to calculate its two-dimensional position by triangulation. Acquisition of an additional signal, resulting in signals 160 from a total of four satellites 120, permits the GPS receiver 140 to calculate its three-dimensional position in a known manner.

Figure 2:
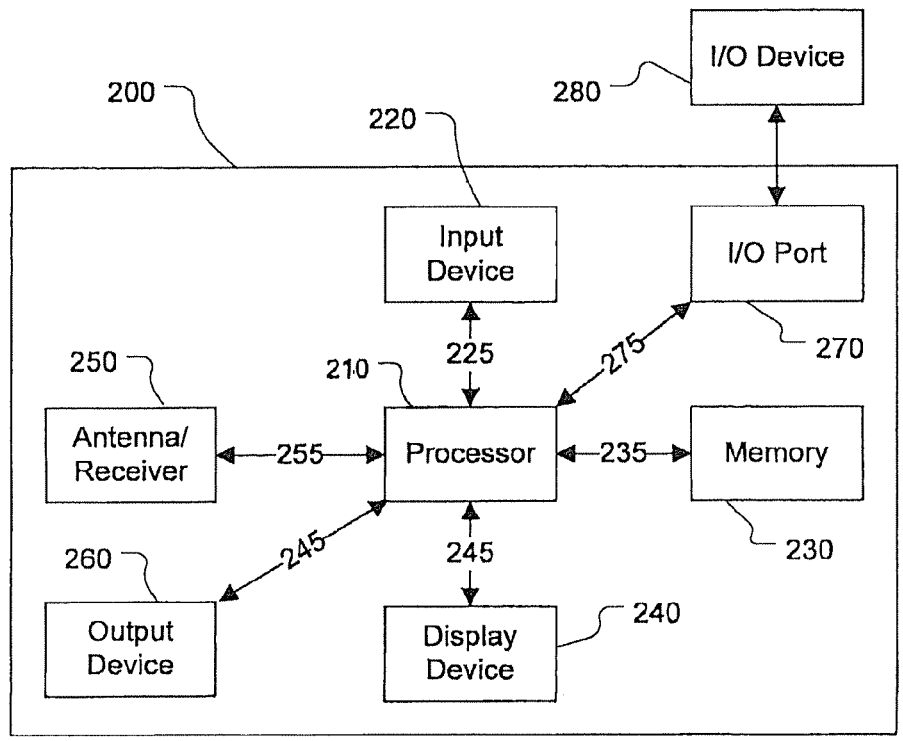
FIG. 2 illustrates a navigation device according to an example embodiment.

FIG. 2 illustrates a block diagram of a navigation device 200 according to an example embodiment. It should be noted that the block diagram of the navigation device 200 is not inclusive of all components of the navigation device, but is only representative of many example components.

The navigation device 200 includes a processor 210 connected to an input device 220 and a display screen 240. The input device 220 may include a keyboard device, voice input device, and/or any other known input device utilized to input information; and the display screen 240 can include any type of display screen such as an LCD display, for example. In at least one example embodiment, the input device 220 and the display screen 240 are integrated into an integrated input and display device, including a touchpad or touchscreen input wherein a user need only touch a portion of the display screen 240 to select one of a plurality of display choices or to activate one of a plurality of virtual buttons.

The navigation device may include an output device 260, for example, an audible output device (e.g., a loudspeaker). As the output device 260 can produce audible information for a user of the navigation device 200, it is should equally be understood that the input device 220 can include a microphone and software for receiving input voice commands as well.

In the navigation device 200, the processor 210 is operatively connected to and set to receive input information from input device 240 via a connection 225, and operatively connected to at least one of the display screen 240 and the output device 250, via output connections 245, to output information thereto. Further, the processor 210 is operatively connected to the memory 230 via the connection 235 and is further adapted to receive/send information from/to input/output (I/O) ports 270 via a connection 275, wherein the I/O port 270 is connectible to an I/O device 280 external to the navigation device 200.

The external I/O device 280 may include, but is not limited to an external listening device such as an earpiece. For example, the connection to the I/O device 280 can further be a wired or wireless connection to any other external device such as a car stereo unit for hands-free operation and/or for voice activated operation, for connection to an ear piece or head phones, and/or for connection to a mobile phone. Moreover, the mobile phone connection may be used to establish a TCP/IP connection between the navigation device 200 and the internet or any other network, and/or to establish a connection to a server via the internet or some other network.

FIG. 2 further illustrates an operative connection between the processor 210 and an antenna/receiver 250 via a connection 255. The antenna/receiver 250 can be a GPS antenna/receiver, for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered within the scope of example embodiments. For example, in one embodiment, the components shown in FIG. 2 may be in communication with one another via wired and/or wireless connections and the like. Thus, the scope of the navigation device 200 includes a portable or handheld navigation device 200.

In addition, the portable or handheld navigation device 200 of FIG. 2 can be connected or "docked" in a known manner to a motorized vehicle such as a car or boat, for example. Such a navigation device 200 is then removable from the docked location for portable or handheld navigation use.

Referring now to FIG. 3, the navigation device 200 may establish a "mobile" or telecommunications network connection with a server 302 via a mobile device (not shown) (such as a mobile phone, PDA, and/or any device with mobile phone technology) establishing a digital connection (such as a digital connection via known Bluetooth technology). Thereafter, through its network service provider, the mobile device can establish a network connection (through the internet for example) with the server 302. As such, the "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device (via a service provider) and another device such as the server 302, using the Internet (such as the World Wide Web), for example, can be done in a known manner. This can include use of a TCP/IP layered protocol, for example. The mobile device can utilize any number of communication standards such as CDMA, GSM and WAN.

As such, an internet connection may be utilized which is achieved via data connection, via a mobile phone or mobile phone technology within the navigation device 200, for example. For this connection, the internet connection between the server 302 and the navigation device 200 is established. This can be done, for example, through a mobile phone or other mobile device and a GPRS (General Packet Radio Service)-connection. GPRS connection is a high-speed data connection for mobile devices provided by telecom operators; GPRS is a method to connect to the internet.

The navigation device 200 can further complete a data connection with the mobile device, and eventually with the internet and server 302, via existing Bluetooth technology, for example, in a known manner, wherein the data protocol can utilize any number of standards, such as the GSRM, the Data Protocol Standard for the GSM standard, for example.

The navigation device 200 may include its own mobile phone technology within the navigation device 200 (including an internal antenna, of the navigation device 200, for example). The mobile phone technology within the navigation device 200 can include internal components as specified above, and/or can include an insertable card (e.g. Subscriber Identity Module or SIM card), complete with necessary mobile phone technology and/or an antenna, for example. As such, mobile phone technology within the navigation device 200 can similarly establish a network connection between the navigation device 200 and the server 302, via the internet for example, in a manner similar to that of any mobile device.

For GPRS phone settings, a Bluetooth enabled navigation device may be used to correctly work with the ever changing spectrum of mobile phone models and manufacturers. Model/manufacturer specific settings may be stored on the navigation device 200, for example. The data stored for this information can be updated.

In FIG. 3, the navigation device 200 is depicted as being in communication with the server 302 via a generic communications channel 318 that can be implemented by any of a number of different arrangements. The server 302 and navigation device 200 can communicate when a connection via communications channel 318 is established between the server 302 and the navigation device 200 (noting that such a connection can be a data connection via mobile device and a direct connection via personal computer via the Internet).

The server 302 includes, in addition to other components which may not be illustrated, a processor 304 operatively connected to a memory 306 and further operatively connected, via a wired or wireless connection 314, to a mass data storage device. The processor 304 is further operatively connected to a transmitter 308 and a receiver 310, to transmit and send information to and from navigation device 200 via communications channel 318, respectively. The signals sent and received may include data, communication, and/or other propagated signals. The transmitter 308 and receiver 310 may be selected and/or designed according to a communications requirement and communication technology used in the communication design for the navigation system 200. Further, it should be noted that the functions of the transmitter 308 and receiver 310 may be combined into a signal transceiver.

The server 302 is further connected to (or includes) the mass storage device 312. The mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through a communications channel 318, and includes the processor 210 and the memory 230, as previously described with regard to FIG. 2, as well as the transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in the memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communications channel 318 generically represents a propagating medium or path that connects the navigation device 200 and the server 302. Both the server 302 and navigation device 200 include transmitters 308, 320 for transmitting data through the communication channel 318 and receivers 310, 322 for receiving data that has been transmitted through the communications channel 318.

The communications channel 318 is not limited to a particular communication technology. The communication channel 318 may include several communication links that use a variety of technologies. For example, the communications channel 318 can be adapted to provide a path for electrical, optical, and/or electromagnetic communications. As such, the communications channel 318 includes, but is not limited to, one or a combination of the following: electric circuits, electrical conductors such as wires and coaxial cables, fiber optic cables, converters, radio-frequency (RF) waves, the atmosphere and empty space. Furthermore, the communications channel 318 can include intermediate devices such as routers, repeaters, buffers, transmitters, and receivers.

In an example embodiment, the communications channel 318 includes telephone and computer networks. Furthermore, the communications channel 318 may be capable of accommodating wireless communications such as radio frequency, microwave frequency, and infrared communication. Additionally, the communications channel 318 can accommodate satellite communication.

The communications signals transmitted through the communications channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA) and Global System for Mobile Communications (GSM). Both digital and analogue signals can be transmitted through the communication channel 318. These signals may be modulated, encrypted and/or compressed signals as may be desirable for the communication technology.

The server 302 is a remote server accessible by the navigation device 200 via a wireless channel. The server 302 may include a network server located on a local area network (LAN), wide area network (WAN) and/or virtual private network (VPN).

The server 302 may include a personal computer such as a desktop or laptop computer, and the communications channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated automatically or upon a user connecting navigation device 200 to the server 302 and/or may be more dynamic upon a more constant or frequent connection being made between the server 302 and navigation device 200 via a wireless mobile connection device and TCP/IP connection, for example. For many dynamic calculations, the processor 304 in the server 302 may be used to handle the bulk of the processing; however, processor 210 of navigation device 200 can also handle much processing and calculation, oftentimes independent of a connection to a server 302.

As indicated above in FIG. 2, a navigation device 200 includes the processor 210, the input device 220, and the display screen 240. The input device 220 and display screen 240 are integrated into an integrated input and display device to enable both input of information (via direct input, menu selection) and display of information through a touch panel screen, for example. Such a screen may be a touch input LCD screen, for example, as is well known to those of ordinary skill in the art. Further, the navigation device 200 can also include any additional input device 220 and/or any additional output device 241, such as audio input/output devices, for example.

Figure 4A:
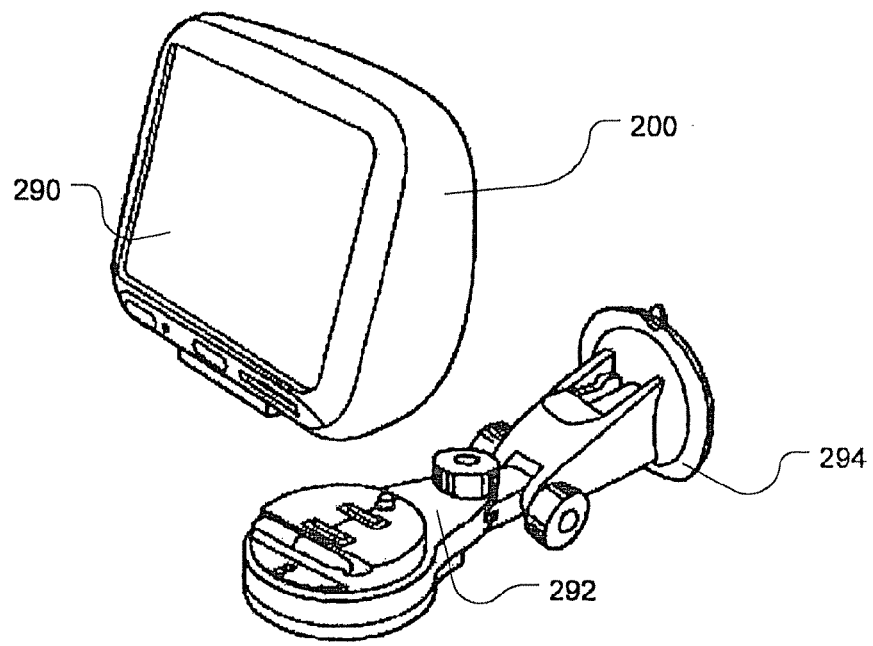
FIGS. 4a and 4b illustrate perspective views of the navigation device of FIG. 2.
Figure 4B:
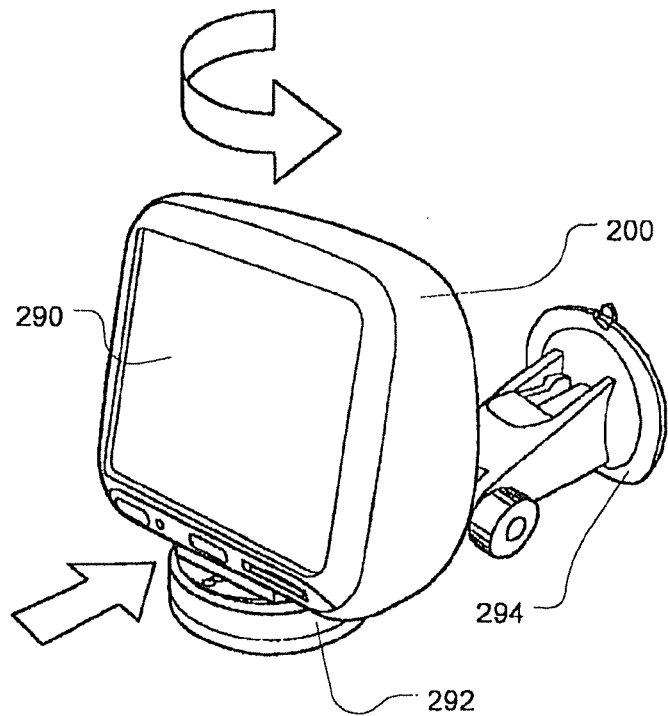

FIGS. 4a and 4b are perspective views of the navigation device 200. As shown in FIG. 4a, the navigation device 200 may be a unit that includes an integrated input and display device 290 (a touch panel screen, for example) and the other components of FIG. 2 (including but not limited to internal GPS receiver 250, microprocessor 210, a power supply, memory systems 230, etc.).

The navigation device 200 may sit on an arm 292, which itself may be secured to a vehicle dashboard/window/etc. using a suction cup 294. This arm 292 is one example of a docking station to which the navigation device 200 can be docked.

As shown in FIG. 4b, the navigation device 200 can be docked or otherwise connected to an arm 292 of the docking station by snap connecting the navigation device 200 to the arm 292, for example. The navigation device 200 may then be rotatable on the arm 292, as shown by the arrow of FIG. 4b. To release the connection between the navigation device 200 and the docking station, a button on the navigation device 200 may be pressed, for example. Other equally suitable arrangements for coupling and decoupling the navigation device to a docking station are well known to persons of ordinary skill in the art.

Figure 5:
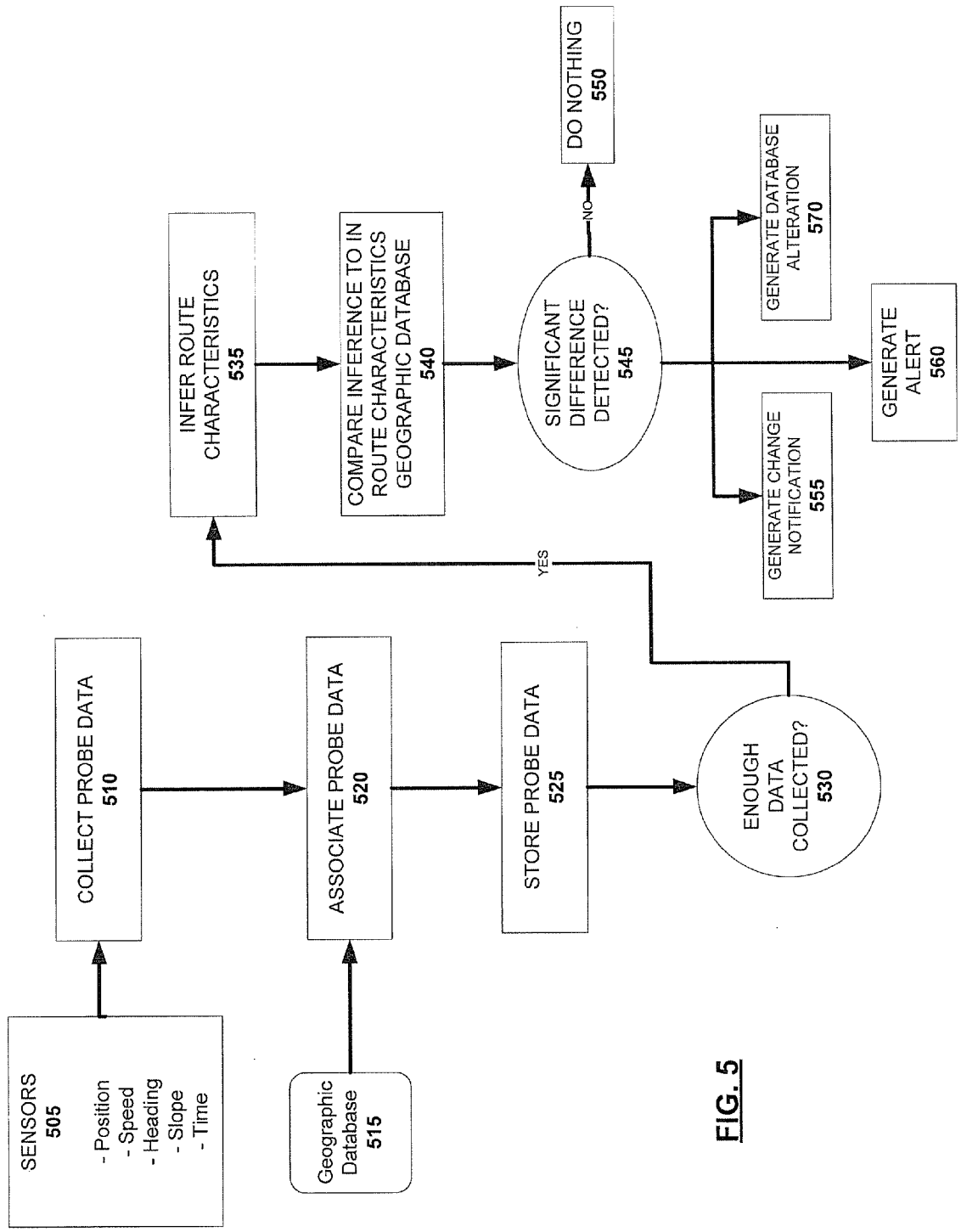
FIG. 5 is a flow diagram of a method of collecting and processing probe data.

FIG. 5 is a flow diagram of an example method of collecting and processing probe data. Probe data as described herein may refer to, for example, any positional data and any data from which a position (e.g., a location) may be derived. Probe data may also refer to, for example, data indicating speed, heading, slope, etc. Such data may be provided by, for example, aerial and satellite photography, terrestrial based imagery from Mobile Mapping Vehicles, GPS and other position determination equipment, GIS platforms and spatial database engines to facilitate making and housing changes, Lidar, Laser Scanners, radars, the internet, telescopic surveys, and any other method of collecting data from which a position may be determined. Probe data may be used to generate, for example, an electronic map, such as an electronic map used in a PND.

Referring to FIG. 5, a method of collecting and processing probe data according to an example embodiment may include collecting data from a plurality of vehicles traversing a network of routes over a first period of time, and then comparing the data to data collected from a plurality of vehicles traversing the same network of routes over a second period of time. By comparing the two sets of data, changes in travel patterns may be used to infer a change in route conditions. For example, if in the first time period vehicle operators travel both North and South over the same or a closely similar locus of points, and in the second period of time travel only North for the same locus of points, it may be inferred that a significant change has been made to the direction of travel allowed on the route that represents this collection of data, and that the route has been made one-way. Similarly, if most vehicles slow before proceeding through a specific intersection in a first period of time, but in a second period of time most vehicles come to a full stop, it may be inferred that a stop requirement has been placed at the intersection. By tracking the behavior of vehicles over time, frequent updates may be made to a geographic database storing probe data and/or inferences made from probe data.

According to an example embodiment of a method of processing probe data as shown in FIG. 5, probe data may be collected in step 510 from sensors in step 505 (e.g. sensors in an electronic device with navigation capabilities, for example, the navigation device 200), such as for position, speed, heading, slope, time, and the like. The probe data may be collected according to any one of various methods of probe data collection. For example, a method of collecting probe data may include recording periodic measurements of time and position, taken by a navigation device 200 for each of a plurality of time periods. As another example, a method of collecting probe data may include recording measurements taken at expected positions of a vehicle traveling a route, the expected positions based on, for example, a vehicle's speed and trajectory, and/or a previously collected probe data stored as a sequential dataset.

The collected probe data in step 510 may be associated with, for example, a known route between two points in step 520. The probe data may be associated with a known route by, for example, using historical route information stored in the geographic database 515. In at least one embodiment, the association of the probe data with a known route in step 520 may be performed using at least one of the navigation device 200, the server 302 and the like.

Probe data collected from the sensors in step 505 may be stored in step 525. The probe data may be stored until a sequential dataset including enough probe data for processing is collected according to step 530. The probe data collected in step 510 may be stored in, for example, the geographic database 515. The geographic database 515 may be part of, for example, the Mass Data Storage 312 connected to server 302.

When enough probe data is collected in step 530, the probe data may be analyzed to make one or more inferences about characteristics of a route in step 535. Route characteristics may include characteristics of a portion of a route and/or characteristics of the route as a whole. For example, route characteristics of a portion of a route may include the likely presence of a stop sign, a yield sign, a traffic light, a no U-turn, a no left turn, a no right turn, a blinking warning light, a blinking stop light, a speed limit sign, a one-way sign, a detour, a closed road, a merge, the number of lanes, a new point-of-interest (POI) and the like. Route characteristics of the route as a whole may include, for example, whether the route is pre-existing route (e.g., known route) or a new route, etc.

In a case where a route is a pre-existing route, in step 540 the inferred route characteristics may then be compared to route characteristic data stored in the geographic database 515. A comparison between the likely value of a route characteristic as characterized by inference and the route characteristics as stored in the geographic database 515 may be performed to determine whether there are any significant differences detected according to step 545. In an example embodiment, the route characteristic data stored in the geographic database 515 used for comparison in step 540 with the route characteristics inferred in step 535 may be inferred route characteristics from one or more prior iterations of the process of FIG. 5.

In an example embodiment, the results of the comparison of step 540 may determine that there are no significant differences such that the action is to do nothing according to step 550. In at least one embodiment, if significant differences are detected in step 545, a plurality of actions may follow, such as to generate a change notification according to step 555, to generate an alert according to step 560, to generate a database alteration according to step 570, or the like.

According to an example embodiment, steps 540-570 are not included in the process of FIG. 5. Although not shown, the route characteristics inferred in step 535 need not be compared to the route characteristics as stored in the geographic database 515 and may be used to create a new map. For example, a new map may be created each time the steps of FIG. 5 are performed.

In a case where a route may be a new route and no association exists, collected probe data may be analyzed to determine the existence, geometry, and attributes of the new route or the like.

One having ordinary skill in the art will understand that described process steps are not limited to a particular sequence, need not necessarily occur at all and variations of the processes are contemplated. For example, according to an example embodiment probe data need not be associated according to step 520. According to an example embodiment, probe data may be associated after enough data is collected according to step 530. As another example, probe data need not be stored according to step 525 but may be processed as it is collected.

In an example embodiment, the process of collecting data in step 510 and storing probe data in step 525 associated with route data from the geographic database 515 may be continuously performed. The process of collecting probe data in step 510 may be iterative. Iterations may be performed a plurality of times, or continuously, for example as an on-going process to collect and make inferences about route characteristics in step 535. The iterative process may include the entire probe dataset or probe datasets corresponding to one or more specific routes. In at least one embodiment, the method of FIG. 5 may be continuous, and represent an ongoing comparison of inferred characteristics for the purpose of detecting significant differences over time.

According to an example embodiment, once probe data is collected in step 510, the example method of processing probe data of FIG. 5 may be performed by the server 302, the navigation device 200 and/or by any computing device. For example, probe data may be collected by the sensors 505 and transmitted from the transmitter 320 of the navigation device 200 to the satellite 120, which may transmit the probe data to the receiver 310 of the server 302. As described above, any communication channel 318 may be used, as well as others not shown. According to at least one example embodiment, the navigation device 200 collects and processes the probe data.

Although example embodiments are described with respect to a route including a road, one having ordinary skill in the art will understand that sensors 505 may collect data corresponding to any travelable route. For example, the sensors 204 may be included in a navigation device 200 of an air, space and/or water vehicle. Further, although example embodiments are described in which sensors 505 detect position, speed, heading, slope, time, and the like, one having ordinary skill in the art will understand that detection of less than all of the parameters may be sufficient and the remaining parameters may be calculated. For example, collection of positional data and a time at which the positional data is recorded may be used to calculate speed, heading, slope, etc. According to an example embodiment, a trajectory of a vehicle moving along a route may be calculated from positional data, speed, heading, slope, etc. Probe data related to an object moving along a route (e.g., a vehicle) not included as a route characteristic such as trajectory, speed, heading, slope, etc., may be collectively called vehicular data.

Figure 6:
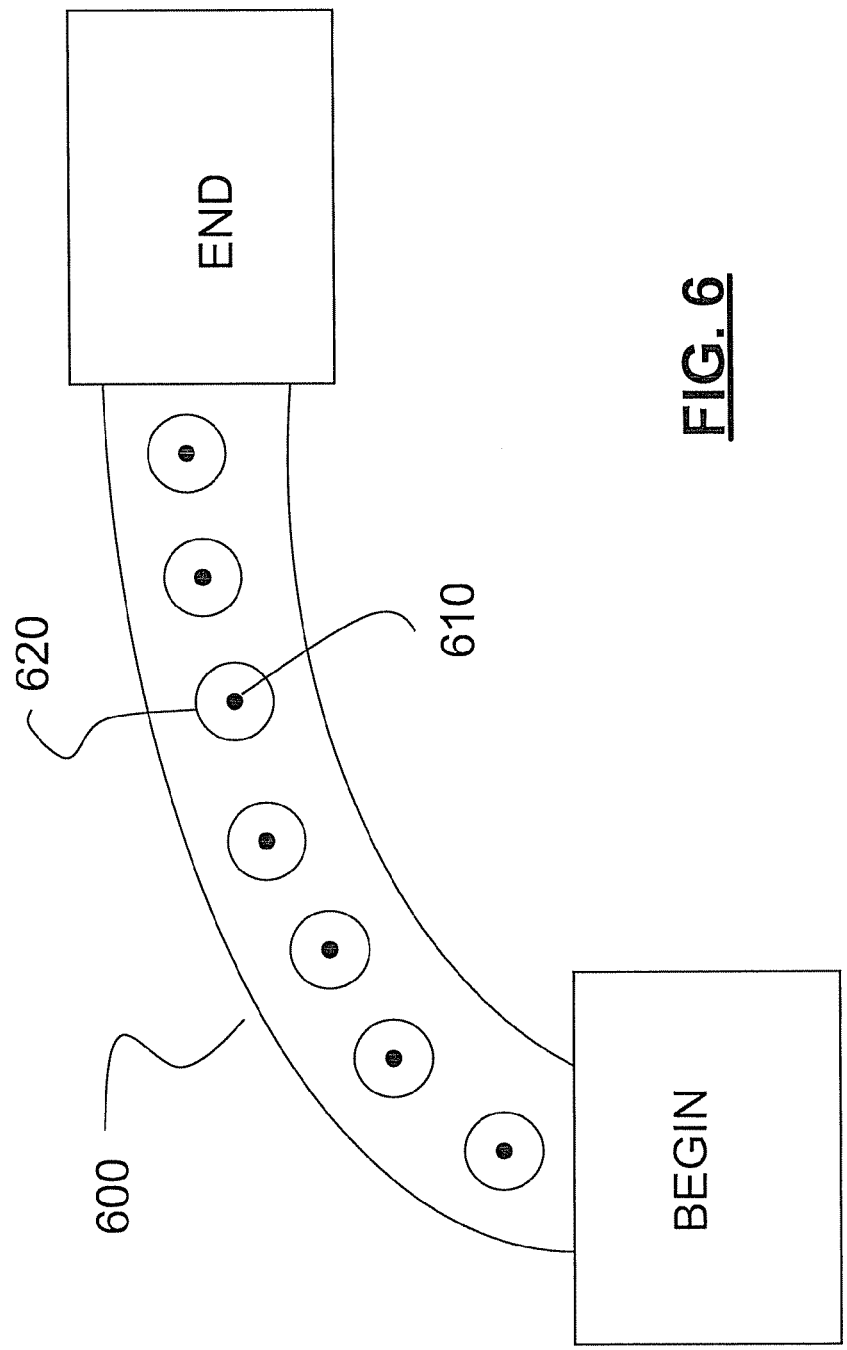
FIG. 6 is a diagram of a route of travel between two points.

FIG. 6 is a diagram of a route of travel 600 between two points. Referring to FIG. 6, positions 610 may be locations along a route 600, the locations being expected locations at which probe data may be measured. For example, a device 200 moving at a uniform speed and recording measurements at uniform intervals may be expected to record at least one probe datum at each position 610 of FIG. 6. Accordingly, the positions 610 are based on the method used to collect probe data in step 510.

The collected probe data may specify virtual positions 620. Under ideal circumstances, the virtual positions 620 exactly overlap the positions 610. However, due to conditions under which probe data may be collected, the location of each virtual position 620 may deviate from the expected position 610. Conditions affecting the location of a virtual position may be any condition that may affect a probe data measurement. For example, conditions of collecting probe data may include a type and/or condition of a navigation device 200 used to collect the probe data, weather conditions, satellite usage characteristics, the presence of satellite signal obstructions, and the like.

Figure 7A:
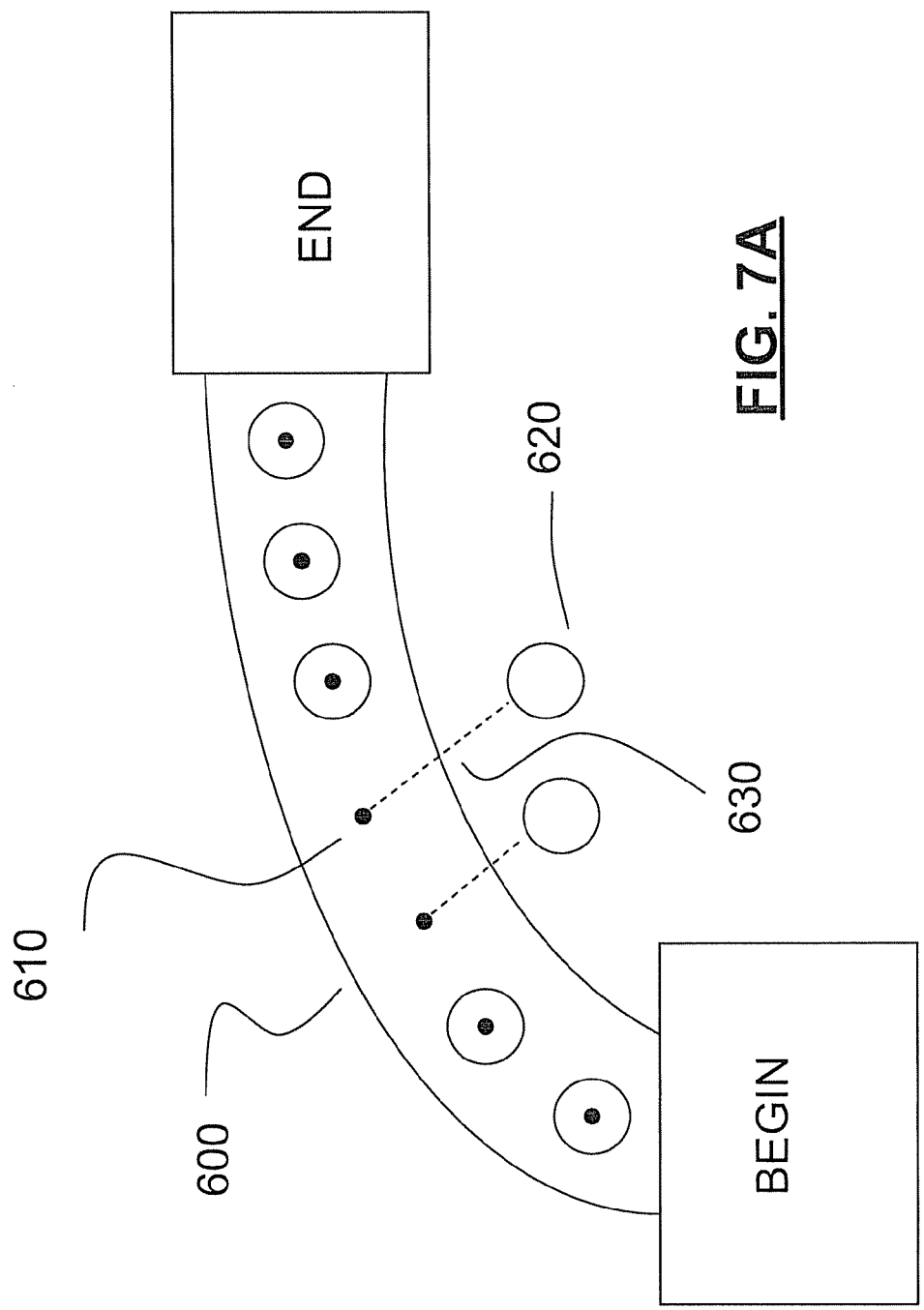

FIGS. 7A-7B are diagrams illustrating example anomalies in a sequential dataset for a route. FIG. 7A is a diagram illustrating data errors in a sequential dataset for a route including a plurality of positions 610. Referring to FIG. 7A, a plurality of positions 610 are shown spaced along a route 600. A plurality of virtual positions 620 of a sequential dataset associated with the positions 610 are not each overlapped with the positions 610. Virtual positions 620 that are not overlapped with positions 610 represent errors 630 in a sequential dataset representing the route 600.

FIG. 7B is a diagram illustrating missing data in a sequential dataset for a route including a plurality of positions 610. Referring to FIG. 7B, a plurality of positions 610 are shown spaced along a route 600. Fewer virtual positions 620 are illustrated than positions 610. Each missing virtual position 620 may correspond to a missing datum (e.g., drop-out) 635 of a sequential dataset corresponding to the route 600.

It is noted that, while FIGS. 7A and 7B are 2 dimensional (2D) representations of positions 610 and virtual positions 620, example embodiments are not so limited. For example, the 2D representation of FIG. 7A may show a shift in a virtual position 620 from an expected position 610 along the ground, and/or FIG. 7A may show a shift in elevation between the virtual position 620 and the position 610. Accordingly, one having ordinary skill in the art will understand that both a position 610 and a virtual position 620 may be relative to more than 2 dimensions.

At least one example embodiment includes a method of processing probe trace data, the method including examining a sequential dataset for a route of travel between two points, identifying at least one anomaly in the sequential dataset, identifying at least one datum of the sequential dataset occupying a sequential position adjacent to the identified at least one anomaly, and inserting at least one non-anomalous datum to occupy a sequential position of the identified at least one anomaly in the sequential dataset, the at least one non-anomalous datum being determined based on one of extrapolation, smoothing and interpolation of the at least one datum.

Figure 8:
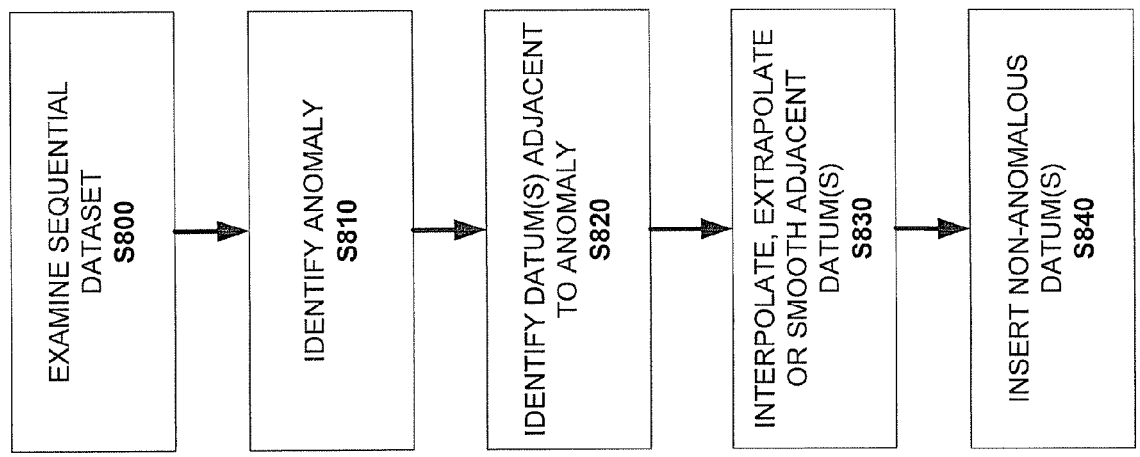
FIGS. 8-11 are flowcharts illustrating methods of pre-processing probe trace data according to example embodiments.

FIG. 8 is a flowchart illustrating an example method of pre-processing probe trace data according to at least one embodiment. Referring to FIG. 8, a sequential dataset for a route of travel between two points is examined in step S800. Any anomalies in the sequential dataset may be identified in step S810. For example, a data error as illustrated in 7A and/or missing data as shown in FIG. 7B may be identified.

In a case where an anomaly is a data error, the anomaly may be identified by, for example, identifying data representing a rapid change in a curvature of the route, data representing erratic shifts in elevation of the route, a satellite usage error, correlating a known location of at least one known obstruction to a portion of the route, identifying changes in the sequential dataset from a historical sequential dataset, etc.

A rapid change in a curvature of a route amounting to an anomaly may be identified by, for example, comparing a curvature of the route determined from probe data to at least one threshold. For example, the at least one threshold may include a maximum and/or minimum curvature threshold. In an example embodiment, the threshold may be derived from characteristics of the route or vehicular data. For example, a maximum curvature of the route may be inferred from the average speed of vehicles travelling the route and a threshold may be set accordingly. Data in a sequential dataset representing a rapid change in curvature for the route may be compared to the threshold. If the data exceeds the maximum curvature threshold, an anomaly may be identified.

However, example embodiments are not limited to such inferences and any methods of determining errors amounting to an anomaly (e.g., changes in curvature, erratic shifts in elevation, etc.) are contemplated. For example, a shift in elevation or a change in curvature amounting to an anomaly may be identified by comparing data of a sequential dataset to known maximum or minimum changes in elevation or curvature for the geographic area in which the data is recorded, as provided by, for example, a geological survey.

An anomaly in a sequential dataset may be identified by determining that a satellite usage error has occurred and correlating the satellite usage error to at least one recorded datum. A satellite usage error may include, for example, a lack of a fix on a prescribed number of satellites, insufficient spread in satellite locations, a use of at least one low angle satellite, etc. One having ordinary skill in the art will understand types of satellite usage errors that may result in anomalous data.

An anomaly in a sequential dataset may be identified by correlating a known location of at least one obstruction to a portion of the route. The obstruction may be an obstruction that prevents adequate reception of, for example, satellite signals and may cause erroneous measurements to be recorded (e.g., erroneous positional measurements). Known obstructions may include, for example, a bridge, a tunnel wall, a dense stand of trees, a tall building, etc. However, these are examples and any obstruction that may cause a measurement error or drop-out in a sequential dataset is contemplated by example embodiments. For example, a fluctuating electromagnetic field in a geographical location that may cause measurement errors may also be considered an obstruction.

In a case where an anomaly is missing data, missing data may be identified by, for example, identifying a missing measurement for a time period of a periodic measurement and/or a missing measurement for a position along the route. For example, if a device 200 records measurements every minute, a corresponding datum is expected for each minute in a temporal sequential dataset for the route. If it is determined that a measurement is not present in the sequential dataset at a time when a measurement is expected, a missing datum may be identified. As another example, if a device 200 records measurements based on a position of the device 200 along a route and a measurement is not recorded for an expected position, a missing measurement may be identified.

According to an example embodiment of FIG. 8, identifying anomalies of the sequential dataset in step S810 may include identifying valid anomalies. A valid anomaly is an anomaly that is not missing data or a data error. Valid anomalies may include data occupying a sequential position in the sequential dataset that corresponds to, for example, an event unrelated to the route. For example, data representing a rapid change in curvature of the route (e.g., a rapid change in curvature corresponding to a 90° turn) followed by an end to a probe trace may indicate that vehicular travel has been terminated before completion of the route. The termination of the trip may be inferred to be a desired change in plans from the original route (e.g., vehicle has been parked). Similarly, a 60-90° followed by a normal straight line or curved driving pattern may be a valid anomaly (e.g., a turn onto a different street). A valid anomaly may or may not be treated as an anomaly within the meaning of step S810.

Once at least one anomaly is identified according to step S810, at least one datum of the sequential dataset occupying a sequential position adjacent to the identified at least one anomaly is identified according to step S820. Identification of the adjacent datum may occur by any known method and may depend on, for example, the method by which the sequential dataset is stored. For example, if the sequential dataset is in the form of a matrix, sequential positioning may be determined according to the form of the matrix and the method by which positional data has been stored.

According to step S830, the at least one adjacent datum may be interpolated, extrapolated or smoothed. For example, if interpolation will be used, a plurality of adjacent data may be identified and the plurality of data interpolated. According to step S840, at least one non-anomalous datum of the fitted curve may be inserted to occupy a sequential position of the identified at least one anomaly. In an example embodiment, the non-anomalous datum includes a plurality of non-anomalous data occupying a sequential position of the anomaly, the plurality of non-anomalous data corresponding to evenly spaced positions along the route.

At least one example embodiment includes a method of processing probe trace data, the method including examining a sequential dataset for a route of travel between two points, identifying at least one anomaly in the sequential dataset, identifying at least one datum of the sequential dataset occupying a sequential position adjacent to the identified at least one anomaly, determining a first trajectory of at least one vehicle based on data of the sequential dataset which occupies a sequential position prior to the identified at least one anomaly, determining a second trajectory of the at least one vehicle based on data of the sequential dataset which occupies a sequential position after the identified at least one anomaly, determining whether or not a correlation exists between the first and second trajectories and inserting at least one non-anomalous datum to occupy a sequential position of the identified at least one anomaly in the sequential dataset, the at least one non-anomalous datum being determined based on one of extrapolation, smoothing and interpolation of the at least one datum.

Figure 9:
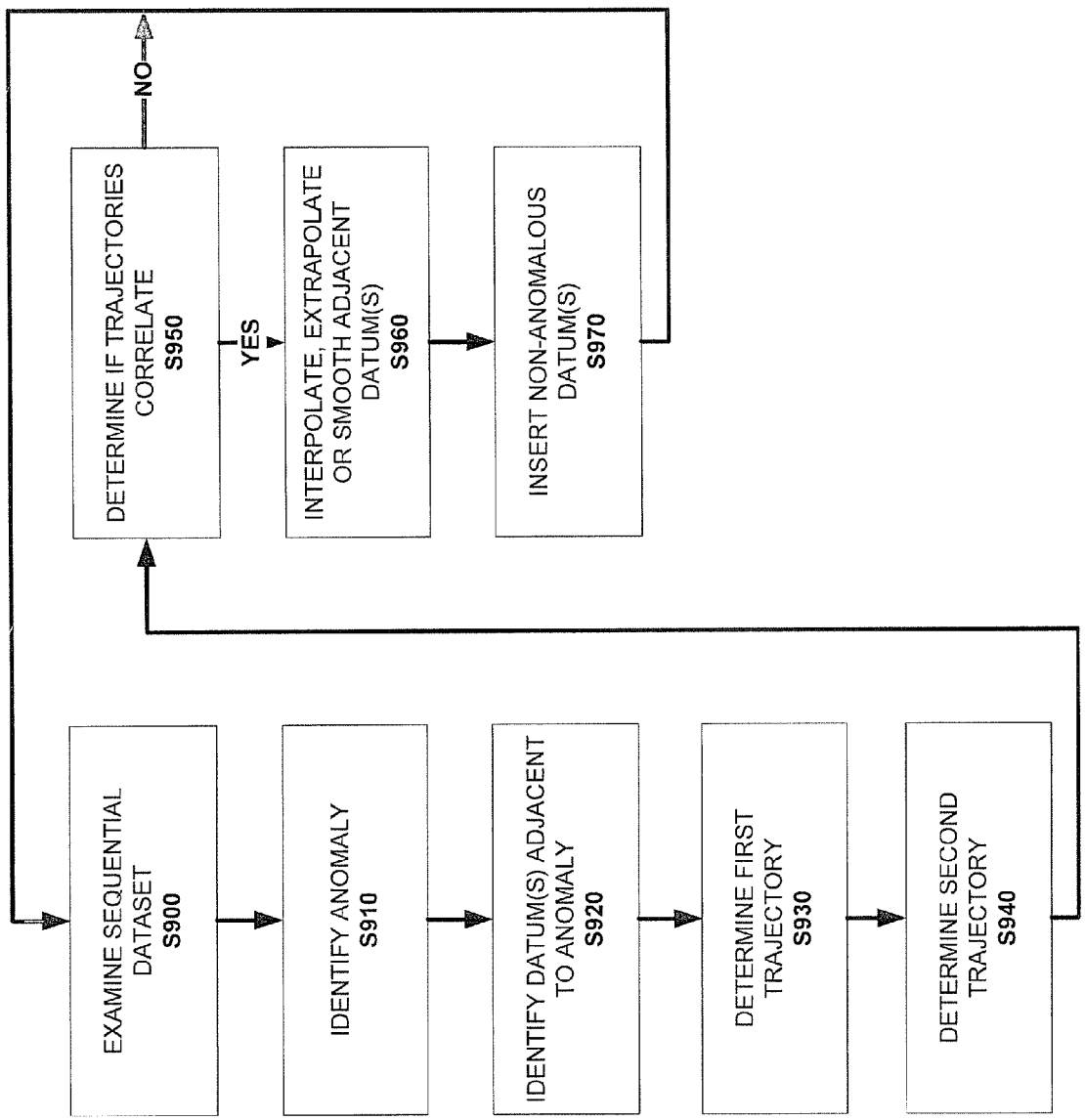

FIG. 9 is a flowchart illustrating an example method of pre-processing probe trace data according to an example embodiment. In FIG. 9, steps S900, S910 and S920 are similar to steps S800, S810 and S820 of FIG. 8, and the description thereof is not repeated. Referring to FIG. 9, a sequential dataset for a route between two points is examined in step S900, at least one anomaly is identified in step S910 and at least one datum adjacent to the at least one anomaly is identified in step S920.

According to step S930, a first trajectory of at least one vehicle is determined based on data of the sequential dataset which occupies sequential positioning prior to the identified at least one anomaly. According to step S940, a second trajectory of the at least one vehicle based on data of the sequential dataset which occupies sequential positioning after the identified at least one anomaly is identified. Once the first and second trajectories of the vehicle are determined, in step S950 it is determined whether or not a correlation exists between the first and second trajectories. If a correlation exists, the at least one adjacent datum may be interpolated, extrapolated or smoothed according to step S960. At least one non-anomalous datum of the fitted curve may be inserted to occupy a sequential position of the identified at least one anomaly in the sequential dataset according to step S970.

According to an embodiment, the method of FIG. 9 is an iterative process and may be continuously performed (e.g., performed for each new sequential dataset). If non-anomalous data is inserted in step S970, the method of FIG. 9 may begin again. If it is determined that a correlation does not exist in step S950, the method of FIG. 9 may also begin again. Iterative pre-processing of probe data is not restricted to the method of FIG. 9 and any embodiment may include iterative pre-processing of probe data.

Figure 10:
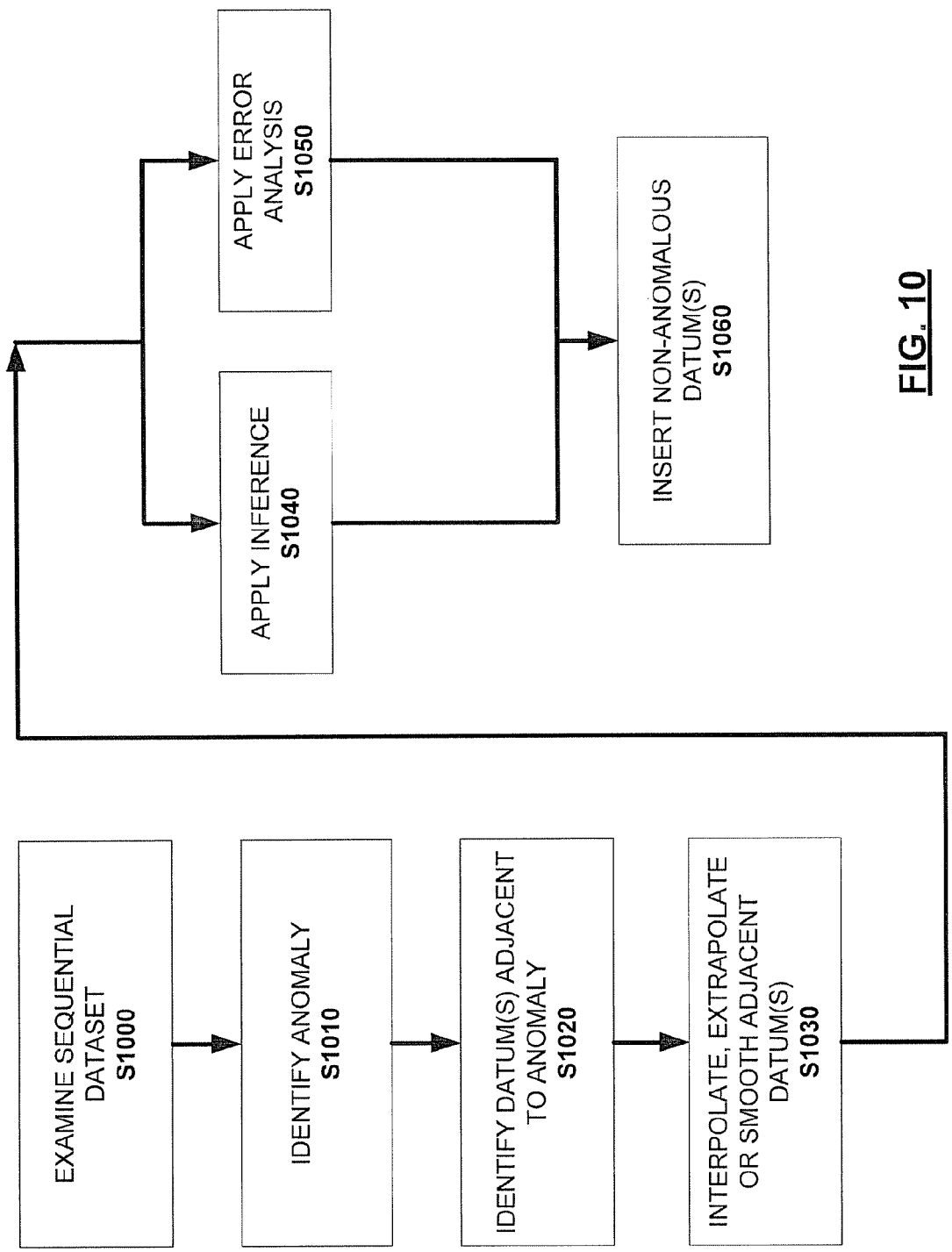

FIG. 10 is a flowchart illustrating an example method of pre-processing probe trace data according to an example embodiment. In FIG. 10, steps S1000, S1010, S1020, S1030 and S1060 are similar to steps S800, S810, S820, S830 and S840, respectively, and a description thereof is not repeated. Referring to FIG. 10, a sequential dataset for a route between two points may be examined in step S1000, at least one anomaly may be identified in step S1010, at least one datum adjacent to the at least one anomaly may be identified in step S 1020 and the at least one adjacent datum may be interpolated, extrapolated or smoothed in step S1030.

According to an example embodiment, an inference derived from at least one of vehicular data and/or at least one characteristic of the route may be applied according to step S1040 and/or the results of a data analysis of a data error may be applied according to step S1050. The application of the inference or data analysis may, for example, modify the fitted curve determined according to step S1030. Therefore, application of an inference according to step S1040 and/or step S1050 may change the value of the non-anomalous data determined by step S1030.

An inference applied in step S1040 may be based on a route characteristic. For example, a maximum or minimum curvature of a portion of the route corresponding to the at least one anomaly may be inferred from, for example, a known curvature of a portion of the route, a location of at least one intersection along the route, whether the route is a detour, whether the route is a highway, a change in elevation of the route, locations of stops along the route, whether the route is under construction, the presence of a structure near the route, the presence of a structure over the route, etc. For example, if the route is under construction, an increased maximum curvature of the route may be inferred to account for construction lane shifts.

An inference applied in step S1040 may also be based on vehicular data. For example, a maximum or minimum curvature of the route may be inferred from, for positions along the route, an average speed of vehicles, a frequency of vehicle stoppages, a frequency of vehicles changing direction, a frequency of vehicles changing lanes and a frequency of vehicular accidents. For example, a relatively high average speed of vehicles on the route may be used to infer a lower maximum curvature of the route.

It is noted that the aforementioned route characteristics and vehicular data are only examples and one having ordinary skill in the art will understand that a number of different inferences may be made from a number of different route characteristics. Any inference that may be made from probe data (e.g., as described above with respect to FIG. 5) is contemplated by example embodiments.

According to step S1040, inferences may be applied to adjust the fitted curve determined according to step S1030. For example, if an inference as to the maximum curvature of the route is made, and the fitted curve determined in step S1030 exceeds the inferred maximum curvature, the non-anomalous data may be adjusted so that it does not exceed the inferred maximum curvature of the route.

The fitted curve of step S1030 may also be adjusted by applying a data analysis of the error. For example, if an analysis of the error in step S1050 determines that the error is biased by a constant value from historical sequential datasets, the fitted curve of step S1030 may be adjusted. In at least one embodiment, the fitted curve may be discarded and replaced by at least one non-anomalous data that is the error with a constant value bias removed.

Steps S1040 and S1050 represent examples of modifications that may be made to the fitted curve determined in step S1030. However, example embodiments include any modifications of a fitted curve S1030. According to at least one example embodiment, step S1030 may be removed and only, for example, steps S1040 and/or S1050 may be applied.

At least one example embodiment includes a method of pre-processing probe data, the method including examining a plurality of sequential location measurements for a route of travel between two points, fitting a best fit mathematical curve to the plurality of sequential location measurements, identifying at least one anomaly by identifying at least one of the plurality of sequential location measurements that does not fall near the best fit mathematical curve within a statistical threshold, removing the identified at least one anomaly, and inserting sequential location data corresponding to the best fit mathematical curve in place of the anomaly.

Figure 11:
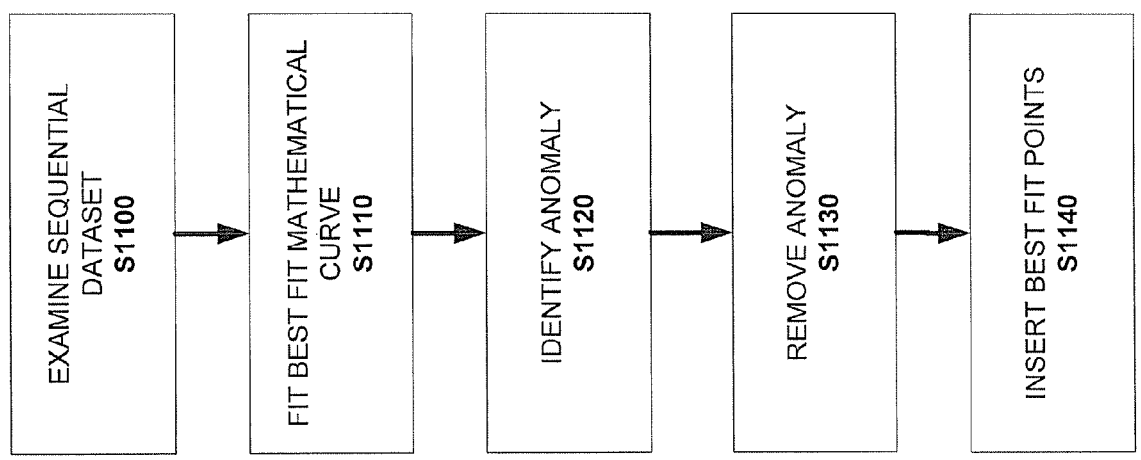
Figure 12B:
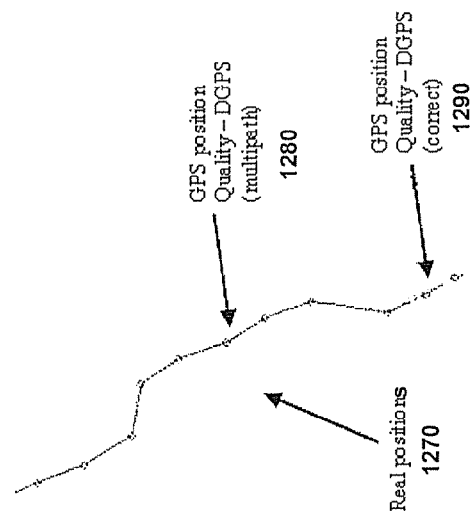
FIGS. 12A and 12B are diagrams illustrating an "urban canyon effect".
Figure 12A:
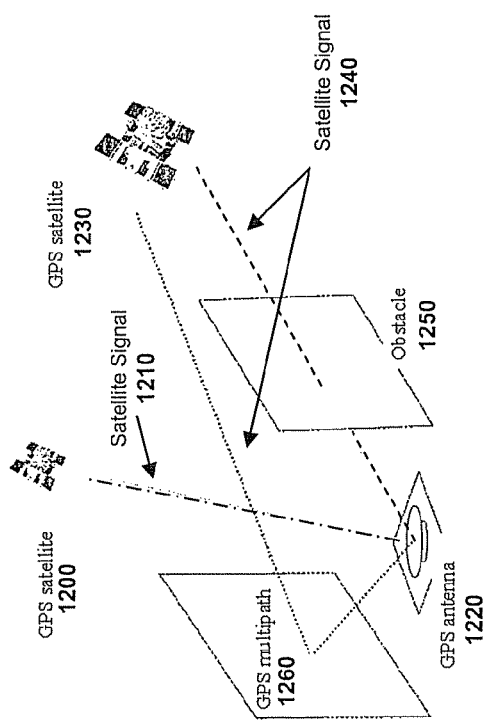

FIG. 11 is a flowchart illustrating an example method of pre-processing probe trace data according to an example embodiment. Referring to FIG. 11, a dataset including sequential location measurements along a route of travel between two points may be examined in step S1100. In step S1110, a best fit mathematical curve may be fit to the sequential location measurements. In step S1120, an anomaly in the sequential location measurements may be identified by, for example, identifying location measurements falling farther away from the best fit mathematical curve than a statistical threshold. The anomaly may be removed in step S1130 by, for example, deleting the location measurements corresponding to the anomaly. According to step S1140, location data of the best fit mathematical curve may be inserted into the sequential location measurement dataset in place of the location measurements removed in step S1130.

One having ordinary skill in the art will understand that a sequential dataset pre-processed according to methods described above may represent a route in a virtual environment of an electronic map. Generally, map features according to data that has been pre-processed may be more accurate than maps that have not been pre-processed. Methods as described herein may improve the accuracy of maps and facilitate maps based on data collected on a continuous basis.

The methods of the embodiments expressed above may be implemented in the form of a device, such as a server and/or a navigation device for example. Thus, such aspects are encompassed within at least one embodiment of the present application.

Further, at least one of the methods of at least one embodiment may be implemented as a computer data signal embodied in the carrier wave or propagated signal that represents a sequence of instructions which, when executed by a processor (such as the processor 304 of the server 302, and/or the processor 210 of the navigation device 200, for example) causes the processor to perform a respective method. In at least one other embodiment, at least one method provided above may be implemented above as a set of instructions contained on a computer readable or computer accessible medium, such as one of the memory devices previously described, for example, to perform the respective method when executed by a processor or other computer device. In varying embodiments, the medium may be a magnetic medium, electronic medium and/or optical medium.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

As one of ordinary skill in the art will understand upon reading the disclosure, the electronic components of the navigation device 200 and/or the components of the server 302 can be embodied as computer hardware circuitry or as a computer readable program, or as a combination of both.

The system and method of embodiments of the present application include software operative on the processor to perform at least one of the methods according to the teachings of the present application. One of ordinary skill in the art will understand, upon reading and comprehending this disclosure, the manner in which a software program can be launched from a computer readable medium in a computer based system to execute the functions found in the software program. One of ordinary skill in the art will further understand the various programming languages which may be employed to create a software program designed to implement and perform at least one of the methods of the present application.

The programs can be structured in an object-orientation using an object-oriented language including but not limited to JAVA, Smalltalk and C++, and the programs can be structured in a procedural-orientation using a procedural language including but not limited to COBAL and C. The software components can communicate in any number of ways that are well known to those of ordinary skill in the art, including but not limited to by application of program interfaces (API), interprocess communication techniques, including but not limited to report procedure call (RPC), common object request broker architecture (CORBA), Component Object Model (COM), Distributed Component Object Model (DCOM), Distributed System Object Model (DSOM), and Remote Method Invocation (RMI). However, as will be appreciated by one of ordinary skill in the art upon reading the present application disclosure, the teachings of the present application are not limited to a particular programming language or environment.

The above systems, devices, and methods have been described by way of example and not by way of limitation with respect to improving accuracy, processor speed, and ease of user interaction with a navigation device.

Further, elements and/or features of different example embodiments may be combined with each other and/or substituted for each other within the scope of this disclosure and appended claims.

Still further, any one of the above-described and other example features may be embodied in the form of an apparatus, method, system, computer program and computer program product. For example, any of the aforementioned methods may be embodied in the form of a system or device, including, but not limited to, any of the structure for performing the methodology illustrated in the drawings.

Example embodiments being thus described, it will be obvious that the same may be varied in many ways. Such variations are not to be regarded as a departure from the spirit and scope, and all such modifications as would be obvious to one skilled in the art are intended to be included within the scope of the following claims.

What is claimed is:

1. A method of pre-processing probe data, the method comprising:
examining a sequential dataset for a route of travel between two points;
identifying at least one anomaly in the sequential dataset;
identifying at least a first and a second datum of the sequential dataset wherein said first datum occupies a sequential position adjacent to the identified at least one anomaly; and
inserting at least one non-anomalous datum to occupy a sequential position of the identified at least one anomaly in the sequential dataset, the at least one non-anomalous datum being determined based on one of extrapolation, smoothing and interpolation of the at least first and second datum, wherein the at least one non-anomalous datum is further determined based on at least one inference derived from at least one characteristic of the route, the at least one characteristic of the route being information other than vehicular data corresponding to the route of travel between the two points.

2. The method of claim 1, wherein the inserting the at least one non-anomalous datum comprises determining a first trajectory of at least one vehicle based on data of the sequential dataset which occupies a sequential position prior to the identified at least one anomaly;
determining a second trajectory of the at least one vehicle based on data of the sequential dataset which occupies a sequential position after the identified at least one anomaly; and
determining whether or not a correlation exists between the first and second trajectories.

3. The method of claim 2, further comprising:
inserting, for correlating trajectories, the at least one non-anomalous datum to occupy a sequential position of the at least one anomaly in the sequential dataset.

4. The method of claim 1, wherein the at least one non-anomalous datum includes a plurality of regularly spaced non-anomalous data.

5. The method of claim 1, wherein the at least one non-anomalous datum is further determined based on at least one inference derived from vehicular data.

6. The method of claim 5, wherein the vehicular data includes, for positions along the route, at least one of an average speed of vehicles, a frequency of vehicle stoppages, a frequency of vehicles changing direction, a frequency of vehicles changing lanes, and a frequency of vehicular accidents.

7. The method of claim 5, wherein the at least one inference is at least one of a maximum and minimum curvature of a portion of the route corresponding to the at least one anomaly.

8. The method of claim 1, wherein the at least one characteristic of the route includes at least one of a curvature of the route, a location of at least one intersection along the route, whether the route is a detour, whether the route is a highway, a change in elevation of the route, locations of stops along the route, whether the route is under construction, the presence of a structure near the route, and the presence of a structure over the route.

9. A method as claimed in claim 1, wherein the identifying of the at least one anomaly includes identifying at least one of at least one error or at least one drop-out in the sequential dataset.

10. The method of claim 9, wherein the identifying of the at least one error includes identifying at least one of data representing a rapid change in a curvature of the route, data representing erratic shifts in elevation of the route, satellite usage error, and changes in the sequential dataset from a historical sequential dataset.

11. The method of claim 10, wherein the satellite usage error includes at least one of a lack of a fix on a prescribed number of satellites, insufficient spread in satellite locations of used satellites, and use of at least one low angle satellite.

12. The method of claim 9, wherein the at least one dropout includes one of a missing measurement for a time period of a periodic measurement and a missing measurement for a position along the route.

13. The method of claim 9, wherein the identifying of the at least one error includes correlating a known location of at least one obstruction to a portion of the route corresponding to the anomaly.

14. The method of claim 13, wherein the at least one obstruction includes at least one of a bridge, a tunnel wall, a dense stand of trees, and a tall building.

15. The method of claim 9, wherein the at least one non-anomalous datum is further based on a statistical analysis of the at least one error.

16. The method of claim 1, wherein the route is a series of positional datums recorded by at least one navigation device.

17. A method of pre-processing probe data, the method comprising:
examining a plurality of sequential location measurements for a route of travel between two points;
fitting a best fit mathematical curve to the plurality of sequential location measurements;
identifying at least one anomaly by identifying at least one of the plurality of sequential location measurements that does not fall near the best fit mathematical curve within a statistical threshold, the identifying based at least in part on at least one inference derived from at least one characteristic of the route, the at least one characteristic of the route being information other than vehicular data corresponding to the route of travel between the two points;
removing the identified at least one anomaly; and
inserting sequential location data corresponding to the best fit mathematical curve in place of the anomaly.

18. A non-transitory computer readable medium having computer readable instructions stored thereon, which when executed on a processor cause the processor to perform a method comprising:
examining a sequential dataset for a route of travel between two points;
identifying at least one anomaly in the sequential dataset;
identifying at least a first and a second datum of the sequential dataset wherein said first datum occupies a sequential position adjacent to the identified at least one anomaly; and
inserting at least one non-anomalous datum to occupy a sequential position of the identified at least one anomaly in the sequential dataset, the at least one non-anomalous datum being determined based on one of extrapolation, smoothing and interpolation of the at least first and second datum, wherein the at least one non-anomalous datum is further determined based on at least one inference derived from at least one characteristic of the route, the at least one characteristic of the route being information other than vehicular data corresponding to the route of travel between the two points.

19. A map comprising features based on data identified using a method comprising:
examining a sequential dataset for a route of travel between two points;
identifying at least one anomaly in the sequential dataset;
identifying at least a first and a second datum of the sequential dataset wherein said first datum occupies a sequential position adjacent to the identified at least one anomaly; and
inserting at least one non-anomalous datum to occupy a sequential position of the identified at least one anomaly in the sequential dataset, the at least one non-anomalous datum being determined based on one of extrapolation, smoothing and interpolation of the at least first and second datum, wherein the at least one non-anomalous datum is further determined based on at least one inference derived from at least one characteristic of the route, the at least one characteristic of the route being information other than vehicular data corresponding to the route of travel between the two points.

20. An electronic device comprising a map stored in a memory in the electronic device, the map comprising features based on data identified using a method comprising:
examining a sequential dataset for a route of travel between two points;
identifying at least one anomaly in the sequential dataset;
identifying at least a first and a second datum of the sequential dataset wherein said first datum occupies a sequential position adjacent to the identified at least one anomaly; and
inserting at least one non-anomalous datum to occupy a sequential position of the identified at least one anomaly in the sequential dataset, the at least one non-anomalous datum being determined based on one of extrapolation, smoothing and interpolation of the at least first and second datum, wherein the at least one non-anomalous datum is further determined based on at least one inference derived from at least one characteristic of the route, the at least one characteristic of the route being information other than vehicular data corresponding to the route of travel between the two points.

* * * * *